United States Patent [19]

Birk

[11] Patent Number: 5,446,559
[45] Date of Patent: Aug. 29, 1995

[54] METHOD AND APPARATUS FOR SCANNING AND PRINTING

[75] Inventor: John R. Birk, Los Altos, Calif.

[73] Assignee: Hewlett-Packard Company, Palo Alto, Calif.

[21] Appl. No.: 956,708

[22] Filed: Oct. 5, 1992

[51] Int. Cl.⁶ ............................................. H04N 1/024
[52] U.S. Cl. ................................. 358/473; 358/472; 358/497; 395/88; 395/114
[58] Field of Search .............. 358/473, 400, 474, 497, 358/472; 370/100; 395/101, 114, 103, 105, 88, 80, 84; 347/109; 346/143

[56] References Cited

U.S. PATENT DOCUMENTS

| | | |
|---|---|---|
| 3,767,020 | 10/1973 | Rowe . |
| 4,574,317 | 3/1986 | Scheible ............................ 358/285 |
| 4,611,246 | 9/1986 | Nihei ................................. 358/472 |
| 4,792,859 | 12/1988 | Wicker et al. .................... 358/473 |
| 4,797,544 | 1/1989 | Montgomery et al. ........... 358/473 |
| 4,851,896 | 7/1989 | Muranaga ......................... 358/473 |
| 4,962,526 | 10/1990 | Kotani et al. ..................... 358/473 |
| 5,002,410 | 3/1991 | Yajima . |
| 5,012,349 | 4/1991 | de Fay . |
| 5,016,023 | 5/1991 | Chan et al. . |
| 5,018,026 | 5/1991 | Takada . |
| 5,019,918 | 5/1991 | Kubota et al. . |
| 5,024,541 | 6/1991 | Tsukada et al. . |
| 5,045,953 | 9/1991 | Kotani et al. . |
| 5,079,639 | 1/1992 | Mochinaga ....................... 358/473 |
| 5,079,739 | 1/1992 | Mochinaga . |
| 5,091,790 | 2/1992 | Silverberg . |
| 5,103,106 | 4/1992 | Crimmins . |
| 5,168,377 | 12/1992 | Nagano ............................ 358/497 |
| 5,172,243 | 12/1992 | Hayashi et al. .................. 358/473 |
| 5,172,243 | 12/1992 | Hayashi et al. .................. 358/400 |
| 5,212,567 | 5/1993 | Kawai et al. ..................... 358/473 |

FOREIGN PATENT DOCUMENTS

| | | | |
|---|---|---|---|
| 0278004 | 6/1987 | European Pat. Off. ....... H04N 1/04 |
| 60-006484 | 1/1985 | Japan ............................ B41J 3/28 |
| 62-179965 | 8/1987 | Japan ............................ B41J 3/28 |
| 62292441 | 12/1987 | Japan ............................ B41J 3/10 |
| 1034060 | 2/1989 | Japan ............................ H04N 1/04 |

OTHER PUBLICATIONS

Anonymous, "Automatic Extraction of Original Features in a Copy Machine"; Aug. 31, 1991; Emsworth (GB); p. 594.
Griffith, Arnold K., Edge Detection in Simple Scenes Using a Priori Information, pp. 371–381, IEEE Transactions On Computers, vol. C–22, No. 4, Apr. 1973.
Davis, Larry S., A Survey of Edge Detection Techniques, pp. 248–270, Computer Graphics & Image Processing, vol. 9, No. 3, Sep. 1975.
(no author indicated) "Motorized Color Scanning", Oct. 1992 Article in BYTE magazine under topic of What's New, p. 74.

Primary Examiner—Edward L. Coles, Sr.
Assistant Examiner—Madeleine Nguyen

[57] ABSTRACT

A method and apparatus for conveying a printing mechanism over a surface of a substrate as the printing means creates indicia on the surface of the substrate. The present invention further provides a method and apparatus for conveying an optical sensor over the surface of the substrate so as to optically scan an image of indicia present on the surface of the substrate. In the preferred embodiment the invention comprises a compact shuttle assembly including a housing that accommodates a mobility subsystem, a sensor subsystem, a printer subsystem and a communications subsystem, each in cooperative communication with a control processor subsystem. In the preferred embodiment the mobility subsystem includes an electric motor rotationally coupled to a rolling member mounted under the housing. The shuttle assembly is guided over a top surface of substrate by selectively activating the mobility subsystem as the rolling member frictionally engages the top surface of the substrate.

18 Claims, 11 Drawing Sheets

METHOD AND APPARATUS FOR SCANNING AND PRINTING

BACKGROUND

The present invention is generally directed to a method and apparatus for image data processing and more particularly to a compact apparatus for printing or scanning and method of using same.

Hand held, manually sweepable image data processing arrangements, such as printers, scanners, and copiers, are known in industry and commerce.

For example, a manually operable sweeping-type printing apparatus is disclosed in U.S. Pat. No. 3,767,020 issued to Rowe on Oct. 23, 1973, entitled "Manually Positionable Automatic Printer." This printer comprises a hand held housing and other components located within the housing, such as a print head, a roll of ink ribbon, a roller, and a ribbon take-up shaft. The roller rotates while being held in contact with a recording medium, as the housing is manually swept across the medium to print data on the medium. Another example of a manually swept printing apparatus is disclosed in U.S. Pat. No. 5,024,541 issued to Tsukada et al. on Jun. 18, 1991, entitled "Manually Operable Sweeping-Type Printing Apparatus."

As another example, a manually swept optical scanner is disclosed in U.S. Pat. No. 5,019,918 issued to Kubota et al. on May 28, 1991, entitled "Portable image scanner." This scanner comprises a hand held housing and other components within the housing, such as an image sensor, a light source, and a roller. The roller rotates while being held in contact with a scanning medium, as the housing is manually swept across the medium to scan image information present on a surface of the medium. An example of a manually swept copying apparatus capable of both scanning and printing is disclosed in U.S. Pat. No. 5,079,639 issued to Mochinga on Jan. 7, 1992, entitled "Hand-Held, Manually Sweepable Image Data Processing Apparatus." An example of a manually swept scanning apparatus used with a facsimile machine is disclosed in U.S. Pat. No. 5,045,953 issued to Kotini et al. on Sep. 3, 1991, entitled "Image Data Transmission Apparatus With Detachable Reader." Since all of these patents provide helpful background information, they are incorporated herein by reference.

Because of their compact construction, these so-called handy devices are not burdened by the size and weight of conventional devices that perform similar functions, such as desk top printers, flat bed scanners and desk top copiers. Furthermore, these handy devices offer superior flexibility in scanning or printing and can be used with over sized media. For example, such handy devices can operate on media that is much larger than a desk top copier.

Despite such positive attributes of these handy devices, other less desirable attributes still remain. For example, these handy devices still require the attention and labor of an operator to manually sweep them over an appropriate medium to produce printing on the medium or a scan of the medium.

Another problem with these handy device is caused by errors inherent in human operators employing manual sweeping methods. For example, the quality of scanning or printing is adversely effected by misalignment and other variations in a manual sweep. What is needed is a method for scanning and printing that retains the advantageous of such compact handy devices while reducing the labor and errors inherent in manual sweeping methods.

SUMMARY OF THE INVENTION

The present invention provides a printing method and apparatus for writing indicia such as characters, graphic symbols, drawings, or the like, on a top surface of a substrate with great efficiency and convenience. The substrate can be, for example, a sheet of paper. The efficiency and convenience of the present invention are achieved by a novel way of conveying a selectively activatable printing mechanism over the top surface of the substrate as the printing mechanism writes on the top surface of the substrate. The present invention further provides a novel scanning method and apparatus for conveying an optical sensor over the top surface of the substrate so as to optically scan an image of indicia present on the surface of the substrate.

Briefly and in general terms, the present invention provides a shuttle assembly comprising a housing and a propelling mechanism that includes an electric motor rotationally coupled to a rolling member mounted under the housing. The shuttle assembly is manually placed adjacent to a top surface of a substrate. The shuttle assembly is propelled over the top surface of the substrate by selectively activating the propelling mechanism. Rotational energy from the motor is coupled to the rolling member as the rolling member frictionally engages the top surface of the substrate.

In accordance with the printing apparatus and method of the present invention, the printhead is mounted on the housing of the shuttle. As the shuttle is propelled over the top surface of the substrate, the printing mechanism is selectively activated to write on the top surface of the substrate. In accordance with the scanning apparatus and method of the present invention, the shuttle assembly further comprises the optical sensor mounted on the housing of the shuttle. As the shuttle is propelled over the top surface of the substrate, the optical sensor scans the top surface of the substrate.

The present invention is not constrained by a large paper carriage that creates size and weight burdens normally associated with conventional desk top printers and flatbed scanners. Since the shuttle is automatically guided over the surface of the substrate, the present invention is free from the human error and labor normally associated with manually sweeping a hand held printer or scanner over the surface of the sheet of paper. In the preferred embodiment, the optical sensor is used in cooperation with other elements of the shuttle assembly to provide both coarse and refined automatic alignment as indicia is written upon the substrate.

In the preferred embodiment the shuttle assembly is in cooperative communication with a remotely located computer. In an alternative embodiment, the shuttle assembly is in cooperative communication with a remotely located facsimile machine. Another alternative embodiment is a stand alone copier that provides for scanning an image of indicia on a first substrate and then creating indicia on a second substrate representative of the image of indicia on the first substrate.

Other aspects and advantages of the present invention will become apparent from the following detailed description, taken in conjunction with the accompanying drawings, illustrating by way of example the principles of the invention.

DETAILED DESCRIPTION OF A PREFERRED EMBODIMENT

Figure 1:
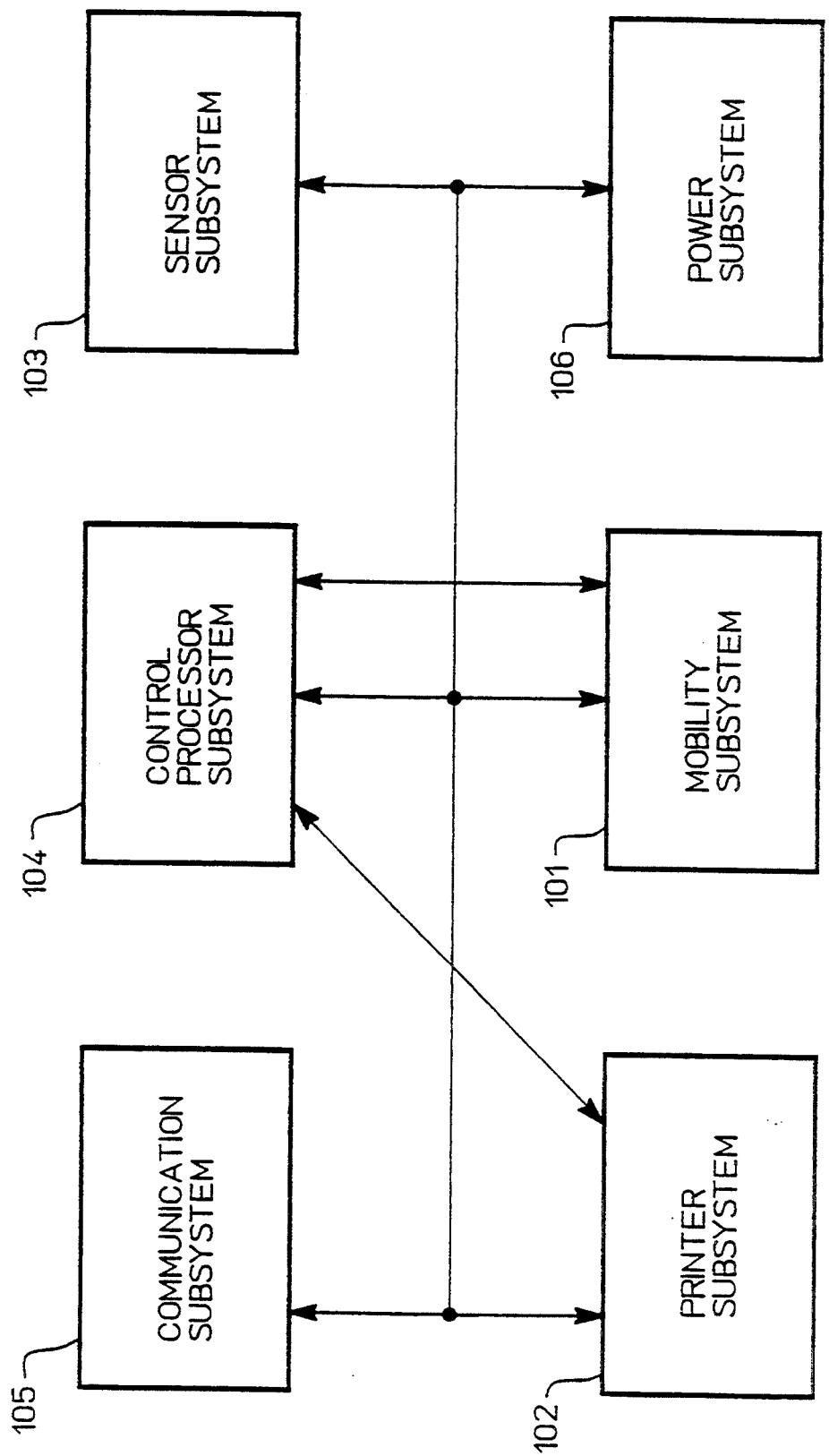
FIG. 1 is a functional block diagram of a shuttle assembly of the present invention.

As shown in the drawings, the present invention is embodied in a novel method and apparatus that conveys a printing means over a top surface of a substrate, writing indicia thereon. The present invention further provides a novel method and apparatus that conveys an optical sensor over the surface of the substrate so as to optically scan an image of indicia present on the surface of the substrate. Various arrangements and methods for printing and scanning are known, but these arrangements and methods have fallen short in providing printing and scanning in an efficient and convenient manner. Desk top printers, flatbed scanners, and desk top copiers are relatively large, heavy and have limited flexibility when used with over sized media for printing or scanning. Compact handy devices such as handy printers, handy scanners, or the like, which are operated by manual sweeping over such media, offer improved flexibility. However manual sweeping of such handy devices requires effort and attention from human operators, who are prone to error. The invention is particularly directed to an apparatus and method for printing and scanning that retains the advantageous of such compact handy devices while avoiding the labor, inaccuracies and instabilities inherent in manual sweeping methods. As will be explained in detail herein, the prefered embodiment of the present invention includes a unique compact apparatus and method of using same that automates printing and scanning operations.

FIG. 1 shows a block diagram of functional subsystems of the apparatus of the present invention. As shown, the apparatus of the present invention is embodied in a compact shuttle assembly which includes a self contained mobility subsystem 101 for propelling the shuttle assembly over a top surface of a substrate. The shuttle assembly further includes a selectively activatable printer subsystem 102 for creating indicia on the surface of the substrate as the shuttle assembly is propelled over the substrate. The shuttle assembly further includes a sensor subsystem 103 for optically sensing an image of indicia present the surface of the substrate.

As shown in FIG. 1, the shuttle assembly further includes a control processor subsystem 104, which is coupled to the mobility subsystem, the printer subsystem and the sensor subsystem. By selectively activating the mobility subsystem, the control processor subsystem controls the velocity and directional orientation of the shuttle assembly as the shuttle assembly is propelled over the substrate. When the shuttle assembly is used in a printing mode, the control processor subsystem selectively activates the printing subsystem to control location and form of indicia created by the printing subsystem as the shuttle is propelled over the substrate. When the shuttle assembly is used in a scanning mode, the control processor subsystem receives an electric image signal generated by the sensor subsystem. The electric image signal is representative of the image of indicia present on the surface of the substrate, which is optically sensed by the sensor subsystem as the shuttle assembly is propelled over the surface of the substrate.

The present invention further includes a communication subsystem 105 coupled to the control processor subsystem to provide cooperative communication between the shuttle assembly and other devices. For example, in a preferred embodiment of the present invention, the communication subsystem provides cooperative communication between the control processor subsystem of the shuttle assembly and a remotely located computer. Through the communication subsystem, the control processor receives a print signal from the remote computer. In response to the print signal, the control processor subsystem controls the printer subsystem and the mobility subsystem to create suitable indicia on the substrate. Through the communication subsystem, the control processor subsystem of the shuttle assembly transmits to the remote computer the electric image signal received from the sensor subsystem.

In an alternative embodiment, the communication subsystem is particularly directed to providing cooperative communication between the control processor subsystem of the shuttle assembly and a remotely located facsimile machine. In a similar manner as described previously, the control processor subsystem controls the printer subsystem and the mobility subsystem to create suitable indicia on the substrate in response to a facsimile signal received from the remotely located facsimile machine. In a similar manner as described previously, the control processor subsystem transmits to the remote facsimile machine the electric image signal received from the sensor subsystem.

In yet another alternative embodiment, the present invention operates as a stand alone copier and the communication subsystem is not used. A record of the electric image scanned by the sensor subsystem from a first substrate is stored in a suitable memory device of the control processor subsystem. The control processor subsystem then generates a print signal to print the record of the electric image onto a second substrate using the printing subsystem.

As shown in FIG. 1, a power subsystem 106 is coupled to each of the printer, scanner, communication, mobility and control processor subsystems to provide electrical power to each of the various subsystems.

A preferred embodiment of the present invention will be described with reference to schematic diagrams of FIGS. 2 to 4. In the drawings, reference numeral 1 denotes a compact shuttle assembly. The housing 2 is generally composed of an upper casing 2a and a lower casing 2b. The housing includes a front portion 3, referred to as a printing and scanning part. Extending rearwardly from the front portion is a more slender or narrow rear portion, so that the housing substantially assumes an overall appearance of a T-shape. This rear portion of the housing, referred to as a grip part, has a shape and physical dimensions that make the grip part a comfortable and convenient location for manually grasping the shuttle assembly. However, the appearance of the housing 2 is not necessarily formed in a T-shape, because the width of the printing and scanning part 3 is determined in accordance with a desired effective width of an objective image plane to be scanned and a desired effective width of an area to be printed. Thus, the overall appearance of the shuttle assembly may assume any shape as required.

The housing 2 accommodates the mobility subsystem, discussed previously, embodied in a mechanism for propelling the shuttle assembly over a top surface of a substrate. In the preferred embodiment, the propelling mechanism includes a pair of electric stepper motors mounted within the housing and a pair of rolling members each rotationally coupled to a respective one of the motors. The pair of rolling members are rotationally mounted under the lower casing 2b for engaging the top surface of the substrate. The pair of rolling members are respectively positioned near opposing transverse ends of the front portion of the housing. For the views shown in FIGS. 2-4, the lower casing 2b has been particularly cut away so as to show details of a first member 6 of the pair of rolling members.

A control processor 4 disposed within the housing is essentially embodied in a suitably programmed microprocessor coupled to a memory device and control electronics. The control processor is electrically coupled by means of suitable power boosting control electronics to the pair of stepper motors for selectively activating the motors, thereby rotating the rolling members and propelling the shuttle assembly over the substrate. For example, a first member 5 of the pair of stepper motors is activated by receiving electrical pulses from the control processor. In response to each of the electrical pulses, the first stepper motor rotates a fraction of a revolution. In response to rotation of the first stepper motor, the first member 6 of the pair of rolling members rotates. The first rolling member frictionally engages the top surface of the substrate as the first rolling member rotates, thereby propelling the shuttle assembly over the substrate. A second member (not shown) of the pair of stepper motors and a second member (not shown) of the pair of rolling members operate together in a similar manner. A position encoder for monitoring position and orientation of the shuttle assembly relative to the substrate is implemented by software which programs the control processor to count a number of electrical pulses sent to the first stepper motor and a number of electrical pulses sent to the second stepper motor. It should be noted that the present invention is not limited in the use of stepper motors since other types of electric motors can be substituted and controlled by electric signals from the control processor with beneficial results. Accordingly, the position encoder means can be alternatively embodied, for example, by software which programs the control processor to count a number of electrical pulses respectively generated by shaft rotation encoders respectively coupled to each of the rolling members.

In the preferred embodiment, a power source 7, for example a battery, is disposed within the housing to provide power to electrical components of the shuttle assembly. In particular, the power source is electrically coupled to the control processor and the stepper motors. In alternative embodiments, the power source is other than a battery, being remotely located from the shuttle assembly and coupled to the shuttle assembly by means of a flexible cable. For example, in one alternative embodiment the power source may be derived from a standard wall mounted power receptacle.

The housing 2 further accommodates the sensor subsystem discussed previously embodied in a mechanism for optically sensing a given image of indicia such as characters or patterns on the top surface of the substrate. Optically speaking, the top surface of the substrate forms an objective image plane I as shown in FIG. 3. In the preferred embodiment, the sensing mechanism includes a sheet light source 8 for illuminating a reading portion of the objective image plane I within view of a reading aperture 9 formed in the lower casing 2b, a reflecting member 10 located substantially just above and at least partially vertically offset from the reading aperture 9 and adapted to refract or reflect a desired image light r reflected from the objective image plane I, and an image processing unit 11 including an activatable image sensor 12 for converting the reflected image light r from the objective image plane I into electric image signals. The control processor is electrically coupled to the image sensor for receiving the electric image signals. The reflecting member and the light source may be mounted within the housing by a supporting member 10'.

In the preferred embodiment, the light source 8 for illuminating the reading portion of the image plane comprises a linear array of light emitting diodes. However this should not be viewed as limiting the present invention, since various alternative types of lamps or luminous means may be used instead with beneficial results. In an alternative embodiment, an energy savings is achieved by sequentially activating and deactivating illumination of each light emitting diode in synchronization with a video scan rate of the optical image sensor.

The image processing unit 11 is mounted inside the grip part and has an optical system 13 including a converging lens for focusing the reflected image light onto the image sensor 512. It is preferable to use a charge coupled device line sensor as the image sensor for converting the reflected image light r sent through the reflecting member 10 and optical system 13 into the electric image signals. Alternatively, other well known optical sensing technologies can be employed with beneficial results.

In the preferred embodiment of the present invention, there is adopted a scanning method in which the given objective image plane to be scanned is notionally divided into a plurality of sub-scanning lines and scanned every sub-scanning line in sequential order. Therefore, the reading aperture 9, which opens in the lower casing 2b at the printing and scanning part of the housing, is formed like a slot and has a transverse dimension along the front portion of the housing. The image scanning is carried out while activating the stepper motors to propel the shuttle assembly over the image plane I. In response to the position encoder, which monitors position and orientation of the shuttle assembly, the image sensor is activated by the control processor to acquire reflected light of sequential sub-scanning lines. In this manner, the image sensor generates sequential video lines that comprise the electric image signal.

The housing 2 accommodates the printing subsystem discussed previously embodied in a selectively activatable printing mechanism for creating indicia on the top surface of the substrate. In the preferred embodiment, the printing mechanism includes a print head having a transverse dimension for creating indicia on a printing portion of the substrate surface adjacent a printing aperture 15 formed in the lower casing 2b. The control processor is electrically coupled to the print head 14 for selectively activating printing elements of the print head to write upon the substrate.

In the preferred embodiment of the present invention, there is adopted a printing method wherein the printing operation is notionally divided into printing a plurality of printing swaths upon the surface substrate. The plurality of printing swaths are adjacent to one another and are printed every printing swath in sequential order as the shuttle is guided over the substrate. Therefore, the printing aperture 15, which opens in the lower casing 2b at the printing and scanning part 3, is formed like a slot and has a transverse dimension along the front portion of the housing to accommodate the transverse dimension of the print head mounted adjacent thereto. The printing is carried out by activating the stepper motors to propel the shuttle assembly over the surface of the substrate. In response to the position encoder means and a print signal received by the shuttle assembly, the print head is selectively activated by the control processor to print the sequential printing swaths.

It should be noted that the inside of the housing 2 is substantially shielded from ambient light except for the reading aperture. In particular, a shield 16 blocks light from entering the housing through the printing aperture 15.

It is preferred that the print head include a print head array having a plurality of selectively activatable printing elements disposed along a transverse dimension of the print head array. An example of such a print head is an expandable array thermal ink jet pen as described in U.S. Pat. No. 5,016,023 entitled "Large Expandable Array Thermal Ink Jet Pen and Method of Manufacturing Same", which is commonly assigned with the present application and is hereby incorporated by reference. Printing flexibility is realized by dynamically selecting a group of adjacent printing elements from the printing elements disposed along the transverse dimension of the array and by selectively activating the grouped elements to write indicia on the substrate. In the preferred embodiment, the control processor activates the propelling mechanism, guiding a motion of the shuttle assembly over the substrate in response to the optical sensor sensing a location of a substrate feature, thereby providing a coarse automatic alignment of the print head array with the substrate feature. In the preferred embodiment, the control processor dynamically selects the members of the group of printing elements in response to the optical sensor sensing the location of the feature, thereby providing a refined automatic alignment of the grouped elements with the substrate feature. In alternative embodiments, printing efficiency is enhanced by extending the selected grouping of elements along the transverse dimension of the array, thereby extending a width of the printing swath produced by the shuttle assembly as the shuttle assembly is guided over the top surface of the substrate.

The following example illustrates the coarse and refined automatic alignment of the present invention as the shuttle assembly writes upon a surface of a pre-printed paper form, such as a pre-printed tax return form having a line pre-printed thereon indicating where the shuttle should "fill in" the form by writing symbols conveying appropriate information. The control processor dynamically selects a group of printing elements adjacent to one another so that the group of elements is in a pre-determined spaced relation with the line on the form as the shuttle passes over the line of the form. For example, if the print head array comprises 100 printing elements disposed along the transverse dimension of the array, the control processor dynamically selects from the 100 elements a 24 member group of adjacent printing elements so that the group of elements is in a predetermined spaced relation with the line on the form as the shuttle passes over the line of the form. It should be understood that though it is preferred that the array has a large number of elements in a range of approximately 100 or more, the single number of 100 elements in the array and the single number of 24 group members are articulated in this example for purposes of clear illustration, and should not be construed as limiting the present invention. Furthermore, the present invention should not be construed as being limited to selecting only a single group of elements. In alternative embodiments, more than one group of elements are selected and activated applying the principles discussed herein, thereby enhancing printing efficiency.

In the preferred embodiment, the control processor receives from the image sensor an electric image signal depicting the pre-printed line and its location on the form so that the control processor dynamically selects the 24 member group of adjacent printing elements in response to the electric image signal. Accordingly, the members of the group are dynamically aligned to be in a proper printing position relative to the line on the form. The control processor activates the propelling mechanism, guiding a motion of the shuttle assembly over the substrate in response to the optical sensor sensing the line on the form, thereby providing a coarse alignment of the print head array with the line. The control processor dynamically selects the 24 members of the group of printing elements in response to the optical sensor sensing the line on the form, thereby providing a refined alignment of the grouped elements with the line.

In response to the print signal and the position encoder, the control processor selectively activates the grouped printing elements to write the appropriate symbols on the form in a predetermined spaced relation with the line. For example, if the print signal comprises a stream of electrical signals describing in general how 24 adjacent printing elements should cooperate to print a letter "A" on the form as the shuttle assembly moves over the surface of the form, then the stream of electrical signals is suitably coupled by means of the control processor to the 24 members of the selected group of printing elements. Accordingly, the stream of electrical signals activates the 24 members of the selected group of printing elements to print the letter "A" on the form in a predetermined spaced relation with the line on the form. It should be noted that the predetermined spaced relations discussed herein can be flexibly selected through programming the control processor with different spacing values. For example, the predetermined spaced relations can be selected so that the writing of the shuttle is contiguous with the line on the form.

The following discussion presents another example further illustrating the coarse and refined automatic alignment of the present invention. As indicated previously, in the preferred embodiment of the present invention, there is adopted the printing method wherein the printing operation is notionally divided into printing a plurality of printing swaths upon the surface substrate. The plurality of printing swaths are adjacent to one another and are printed every printing swath in sequential order as the shuttle is guided over the substrate. In the preferred embodiment the printing swaths are sequentially aligned with each other using the alignment principles discussed and are printed every printing swath in sequential order as the shuttle is guided over the substrate. For example, after the shuttle writes an initial printing swath on the substrate, the shuttle assembly is guided over the substrate to write a subsequent printing swath adjacent to the initial printing swath. A transverse extremity of the reading aperture 9 partially overlaps an adjacent portion of the initial printing swath as the shuttle prints the subsequent printing swath. Accordingly, the control processor receives from the image sensor an electric image signal depicting the adjacent portion of the initial printing swath and its location on the substrate. The control processor activates the propelling mechanism to guide the motion of the shuttle assembly in response to the optical sensor sensing the adjacent portion of the initial printing swath, thereby providing a coarse alignment of the print head array with the initial printing swath. The control processor dynamically selects a group of adjacent printing elements in response to the optical sensor sensing the adjacent portion of the initial printing swath, thereby providing a refined alignment of the subsequent printing swath with the initial printing swath. For example, the control processor dynamically selects from the 100 elements disposed along the transverse dimension of the print head a 24 member group of adjacent printing elements in response to the optical sensor sensing the adjacent portion of the initial printing swath. Members of the group are selected so that the group of elements is in a predetermined spaced relation with the initial printing swath as the grouped elements are activated to print the subsequent printing swath.

Once again, it should be noted that the predetermined spaced relations discussed herein can be flexibly selected through programming the control processor with different spacing values. For example, by selecting the predetermined spaced relation, the shuttle can write the subsequent printing swath so as to be contiguous with the initial printing swath. Such an ability to print contiguous sequential printing swaths is especially advantageous in graphics printing applications, wherein the contiguous sequential printing swaths together depict a graphical figure that is larger than a single printing swath. The alignment provided by the present invention limits undesirable breaks and gaps in the graphical figure.

Figure 5:
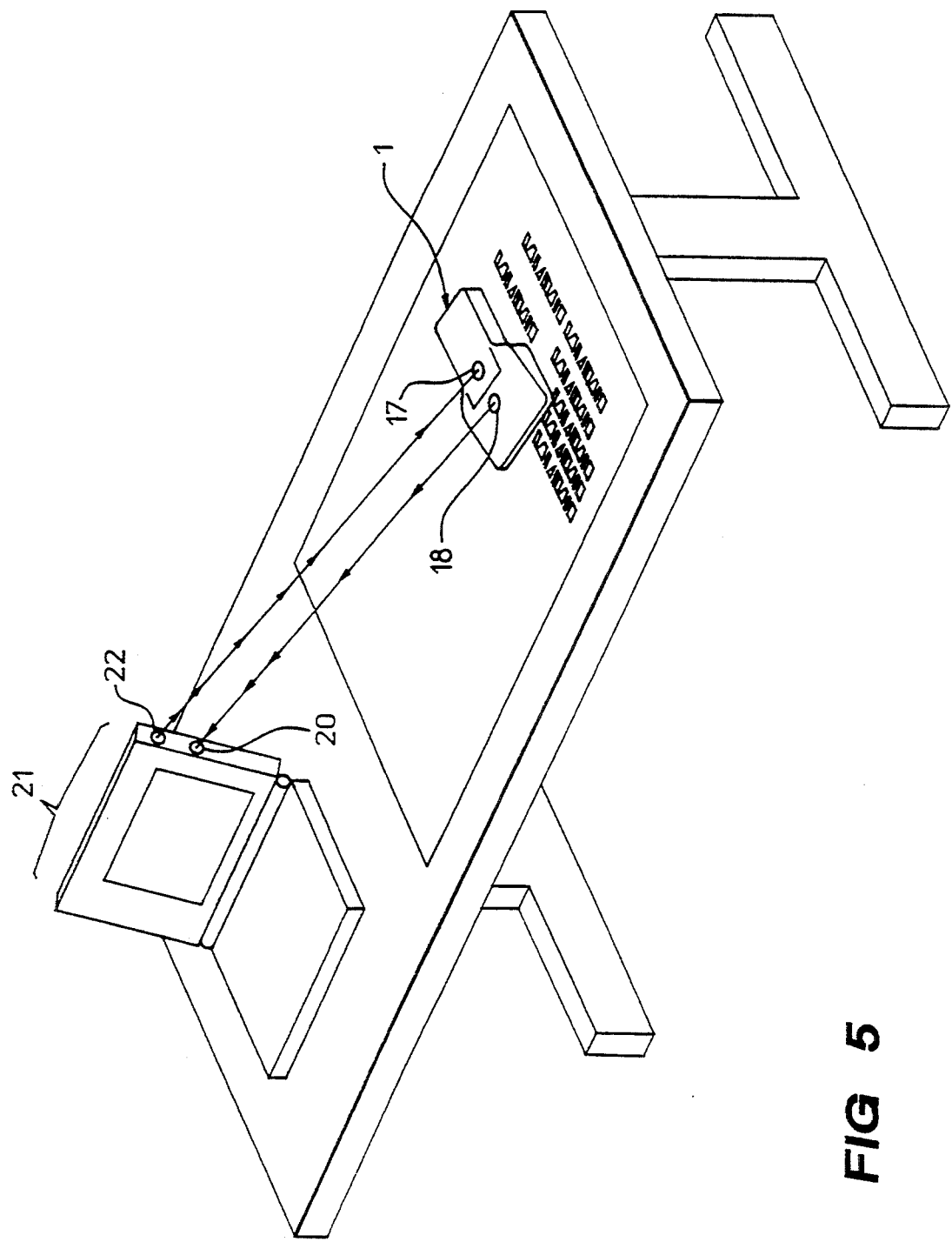
FIG. 5 is a perspective view of the shuttle assembly used in conjunction with a remotely located computer.

In the preferred embodiment, the housing 2 accommodates the communication subsystem, discussed previously, embodied in a means for providing two-way infrared optical data communication link with a remotely located computer. The communication means includes an infrared shuttle receiver 17 and an infrared shuttle transmitter 18 each coupled to the control processor and mounted on an exterior surface of the upper casing of the shuttle assembly. When the preferred embodiment of the present invention is operated in the scanning mode, an infrared receiver 20 of the remotely located computer 21 receives the electric image signal by means of a first modulated infrared optical carrier signal from the infrared shuttle transmitter of the shuttle assembly, as shown in FIG. 5. When the preferred embodiment of the present invention is operated in the printing mode, the infrared shuttle receiver 17 receives the print signal by means of a second modulated infrared carrier signal from an infrared transmitter 22 of the remote computer. In response to the print signal and the position encoder means, the control processor controls the printing mechanism and the mechanism for propelling the shuttle assembly, thereby creating suitable indicia on the substrate. In alternative embodiments, a communication link is established using a flexible cable coupled between the control processor and a remote device.

In the preferred embodiment the infrared shuttle transmitter includes a plurality of infrared photodiodes, which generate the first infrared carrier signal, which is modulated by the electric image signal using well known techniques. The infrared shuttle transmitter further includes a hemispherically shaped lens optically coupled to the diodes for dispersing the modulated infrared carrier, which is ultimately received by infrared receiver of the remotely located computer. The infrared shuttle transmitter further includes an infrared transparent hemispherical enclosure for protecting the lens, diodes and associated electronic circuitry.

In the preferred embodiment the infrared shuttle receiver includes a plurality of infrared sensitive photo diodes, which receive the second modulated infrared carrier from the infrared transmitter of the remotely located computer. A hemispherical lens optically coupled to the infrared sensitive photodiodes concentrates the modulated infrared carrier received thereat. As with the shuttle receiver, the infrared shuttle transmitter further includes an infrared transparent hemispherical enclosure for protecting the lens, diodes and associated electronic circuitry. The enclosure further acts as an optical filter, substantially blocking ambient light at frequencies above infrared from reaching the photodiodes of the receiver, thereby improving the operation of the receiver. Using well known techniques, the print signal is extracted from the second modulated infrared carrier received by the infrared shuttle receiver.

Figure 2:
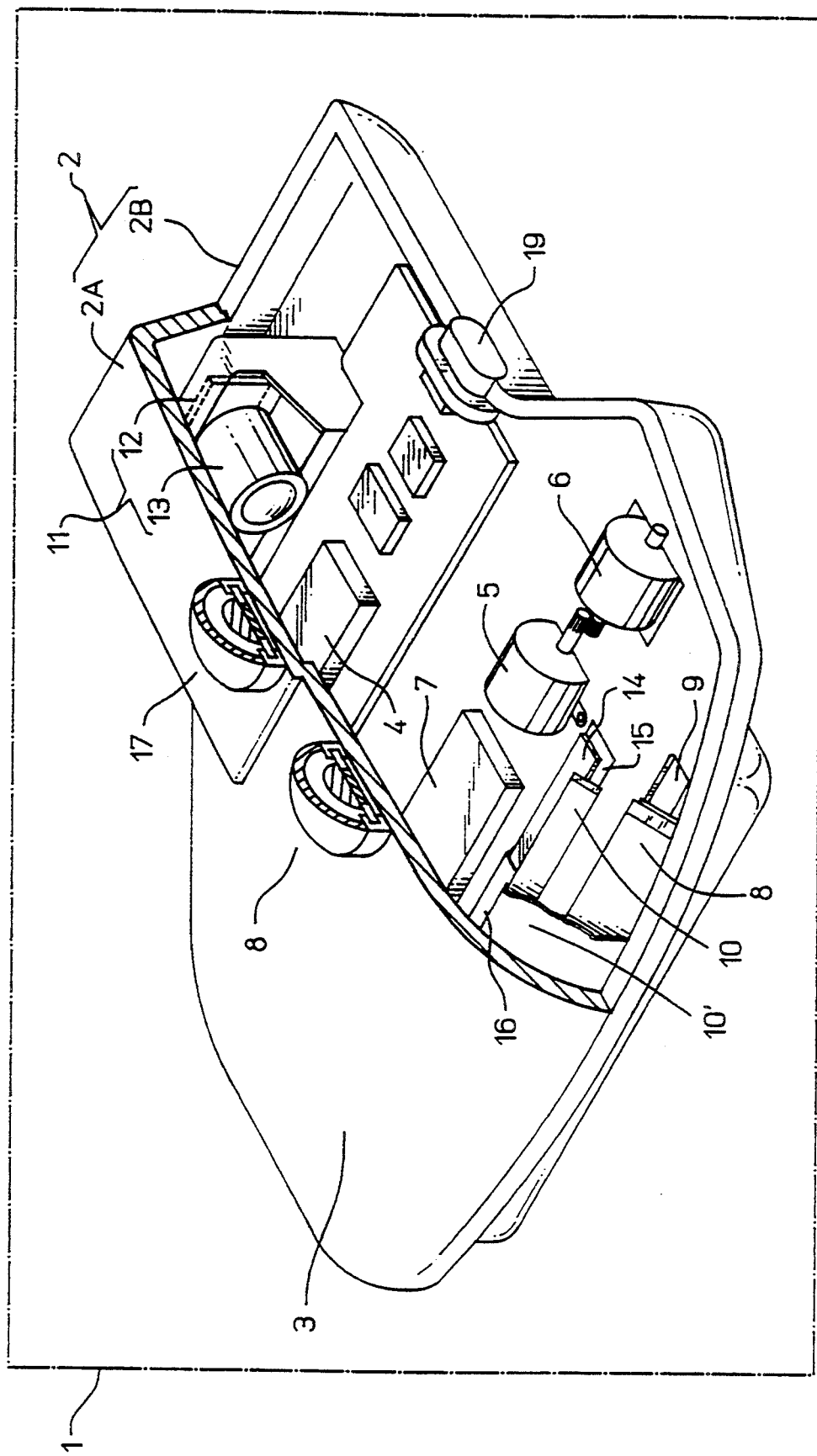
FIG. 2 is a partially sectioned perspective view showing one embodiment of the shuttle assembly of the present invention.
Figure 3:
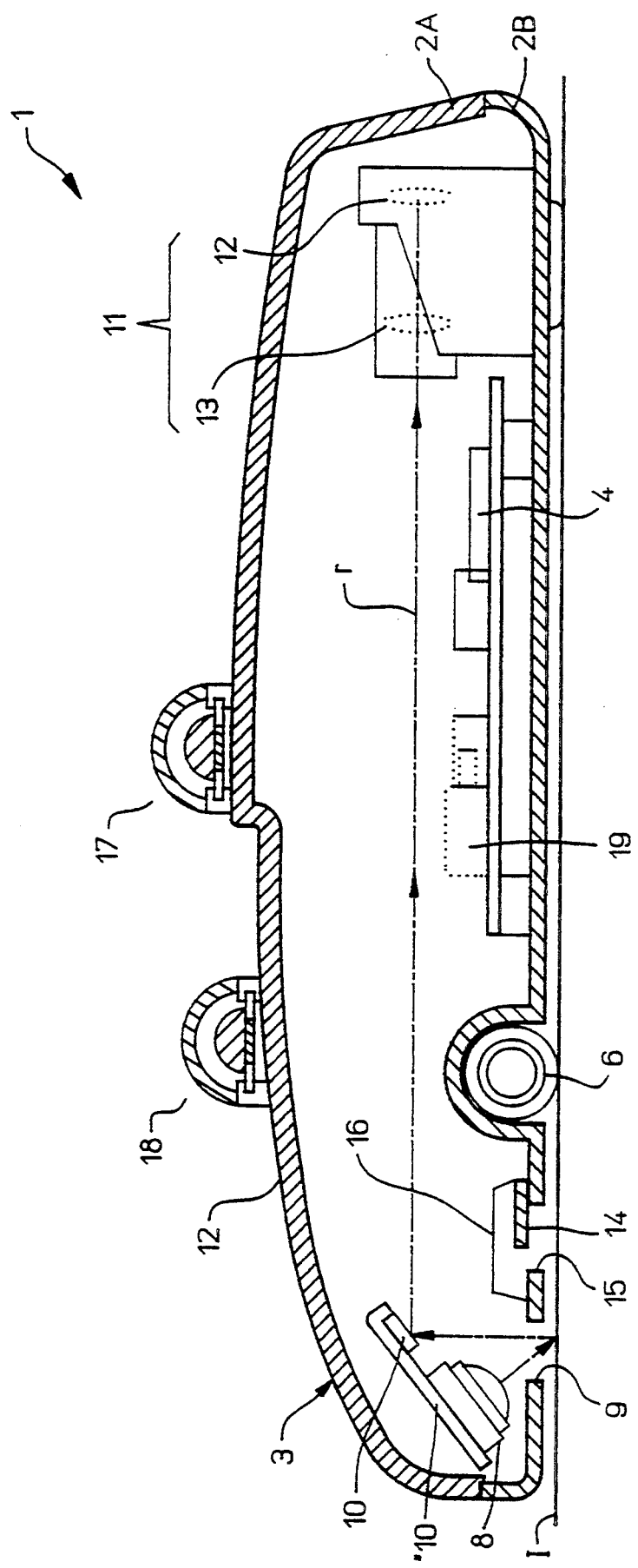
FIG. 3 is a side sectional view of the same.
Figure 4:
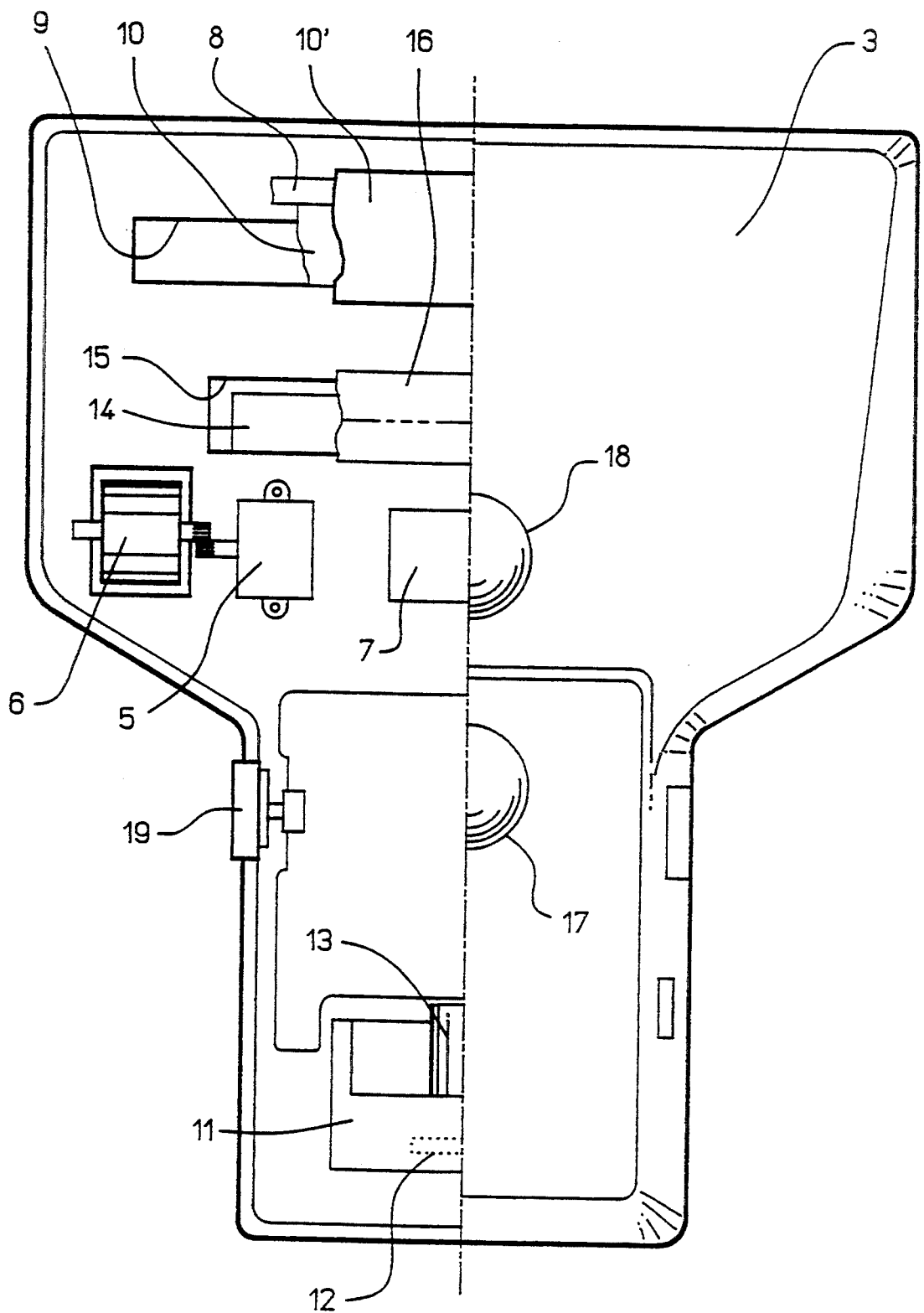
FIG. 4 is a plan view, partly in axial section, of the same.

As shown in FIGS. 2-4, the preferred embodiment of the shuttle assembly further includes a manually activatable start control 19 disposed along an exterior surface of the housing of the shuttle and coupled to the control processor. Manual activation of the start control causes the shuttle assembly to begin a calibration process as discussed later herein.

Figure 6:
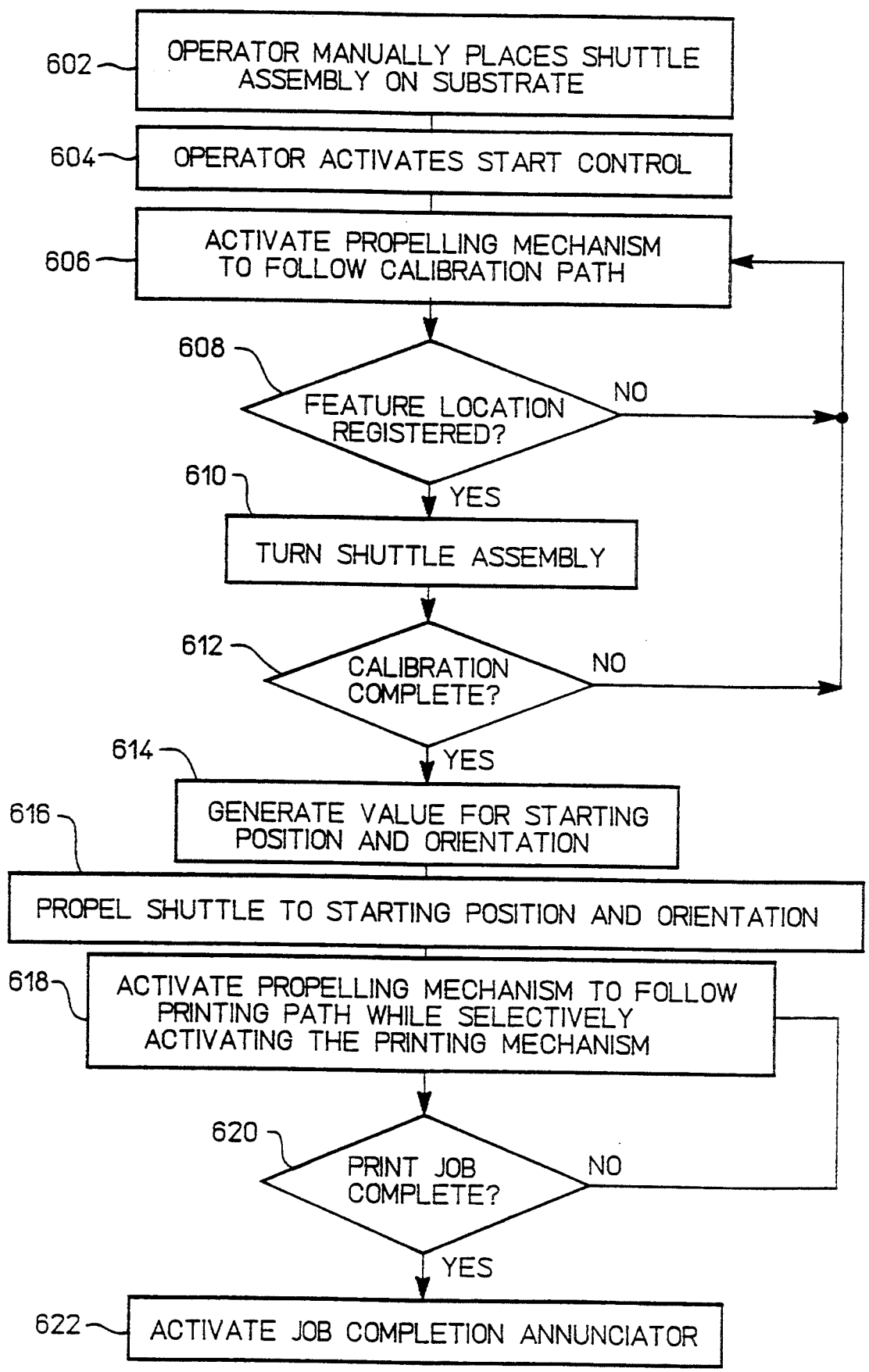
FIG. 6 is a flow chart of the printing method of the present invention.

For the purposes of illustrating a preferred embodiment of the printing method of the present invention, a flow chart is shown in FIG. 6. As indicated by block 602 of FIG. 6, an operator grasps the grip part of the housing of the shuttle assembly and manually places the shuttle assembly adjacent a top surface of the substrate so that the rolling member frictionally engages the top surface of the substrate. This can be accomplished, for example, by manually placing the shuttle assembly directly upon the top surface of the substrate. Alternatively, this can be accomplished by manually placing the shuttle assembly adjacent the substrate and rolling the shuttle assembly until the rolling member frictionally engages the top surface of the substrate.

In placing the shuttle assembly adjacent the top surface, the operator orients the front portion of the housing so that the front portion of the housing generally faces directly towards a location of a substrate feature. In the preferred embodiment this feature includes a first edge of the substrate. In alternative embodiments this feature includes indicia present on the top surface of the substrate, for example a fiducial marking.

In accordance with the flow chart shown in FIG. 6, the operator manually activates the start control (block 604), causing the shuttle assembly to begin a calibration process for identifying the size of the substrate, and the orientation and location of the substrate relative to the shuttle. In response to activation of the start control, the control processor activates the propelling mechanism to propel the shuttle assembly along a calibration path (block 606) to a location of the substrate feature. In the preferred embodiment, the image sensor of the shuttle assembly is used to sense the feature. Alternatively, other suitable sensors can be used with beneficial results.

As the shuttle assembly is propelled along the calibration path, the position encoder monitors position and orientation of the shuttle assembly relative to the substrate. Accordingly, the position encoder generates a respective position and orientation value corresponding to each location along the calibration path. As will be explained later herein, when the shuttle assembly encounters the substrate feature, a position and orientation value corresponding to location of the feature are stored in memory of the control processor to register location of the substrate feature (block 608). The propelling mechanism is then activated to turn the shuttle assembly away from the feature encountered (block 610). In a similar manner as just discussed, the shuttle assembly continues along the calibration path, until the entire calibration path is traversed and the calibration process is complete (block 612). For example, when another substrate feature is encountered along the calibration path, position and orientation of the other feature are registered. The shuttle assembly executes another turn, and the shuttle assembly continues proceeding along the calibration path until calibration is complete (block 612). The calibration process of the preferred embodiment is further illustrated in greater detail in the following example.

Figure 7:
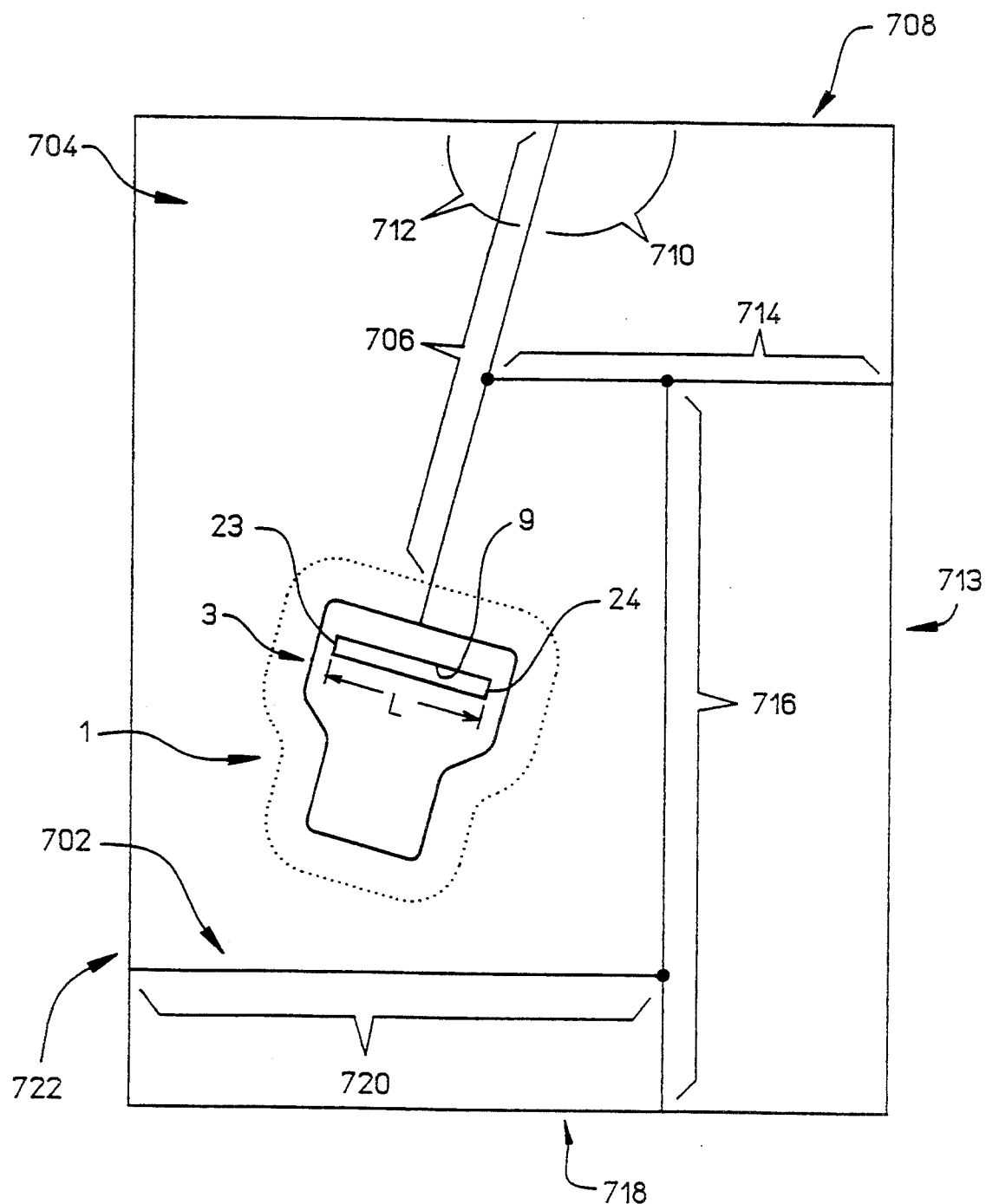
FIG. 7 is a plan view of an example calibration path traversed by the shuttle assembly.

An example of a calibration path 702 on a rectangular sheet of paper 704 is shown in FIG. 7. An operator manually places the shuttle assembly 1 adjacent a top surface of the sheet of paper. As previously indicated, the operator orients the front portion 3 of the housing so that the front portion of the housing generally faces directly towards a first edge 708 of the sheet of paper. The propelling mechanism propels the shuttle assembly in a forward direction along a first straight portion 706 of the calibration path, toward the first edge 708 of the substrate.

Since the front portion of the housing is oriented toward the first edge of the substrate, the reading aperture 9 in the front portion 3 of the housing passes over the edge of the substrate while a remaining portion of the housing is still positioned over the surface of the sheet of paper. As the reading aperture is propelled over the first edge of the substrate, the image sensor optically senses the first edge.

In the preferred embodiment, the control processor receives from the image sensor an electric image signal representative of the first edge. The control processor employs an edge detection technique to detect the first edge based upon the electric image signal received. The location of the detected edge is registered as explained later herein. A number of different known edge detection techniques are discussed in Davis, "A Survey of Edge Detection Techniques", Computer Graphics & Image Processing, Vol. 4, no. 3, Sept., pp 248–270 (1975), which is incorporated herein by reference. The preferred embodiment of the present invention realizes detection of the first edge by employing Griffith's operator as discussed in the Davis article. Alternative edge detection techniques can be employed with beneficial results.

As shown in FIG. 7, there is an obtuse angle 710 and acute angle 712 between the first portion 706 of the calibration path and the first edge of the substrate. Accordingly, a first transverse extremity 23 of the reading aperture 9 is first to encounter the first edge, and an opposing transverse extremity 24 of the reading aperture 9 is last to encounter the first edge of the substrate. It should be understood that the relative positioning of the acute and obtuse angles and of the first and opposing transverse extremities of the reading aperture can be symmetrically reversed from that shown in FIG. 7. When the first transverse extremity of the reading aperture encounters the first edge, the control processor registers a first position value $P_1$ of the shuttle assembly in response to the image sensor and the position encoder. The shuttle assembly continues forward until the sensing mechanism optically senses that the opposing transverse extremity of the reading aperture encounters the first edge. In response to the image sensor and the position encoder, the control processor then registers a second position value $P_2$ and controls the propelling mechanism to halt the shuttle assembly from continuing in the forward direction along the first portion of the calibration path.

The control processor generates and stores in memory an average value of the first and second position values to register the location of the first edge detected by the shuttle assembly. Since the first and second position values are trigonometrically related, the control processor generates a measure of the acute angle 712 using the following equation:

$$\text{acute angle} = \tan^{-1}(L/(P_2 P_1))$$

where L corresponds to the transverse dimension of the reading aperture, $P_1$ is the first position value, and $P_2$ is the second position value.

The control processor uses the measure of the acute angle in controlling the propelling mechanism to turn the shuttle assembly. In order to execute a first turn, the control processor controls the propelling mechanism to propel the shuttle assembly in a reverse direction, away from the first edge 708 of the substrate. In so doing, the control processor controls the propelling mechanism to halt the shuttle assembly after essentially retracing a part of the first straight portion 706 of the calibration path. The shuttle assembly then rotates in place, turning so that the front portion of the shuttle faces away from the first edge previously encountered. For example, the shuttle assembly shown in FIG. 7 rotates in a clockwise direction in a plane parallel to the top surface of the substrate. The shuttle assembly rotates by an amount related to the measure of the acute angle, thereby orienting the front portion of the housing face directly toward a second edge 713. In the preferred embodiment, this rotation of the shuttle assembly is done by the control processor independently controlling rotation of the first and second stepper motors.

The propelling mechanism is then activated to propel the shuttle assembly in a forward direction along a second straight portion 714 of the calibration path, toward the second edge 713 of the substrate. Upon encountering the second edge, the shuttle assembly detects the second edge in a similar manner as discussed previously with respect to the first edge. The shuttle assembly also registers a location of the second detected edge in a similar manner as discussed previously.

In order to execute a second turn, the control processor controls the propelling mechanism to propel the shuttle assembly in a reverse direction, away from the second edge 713 of the substrate. The control processor then controls the propelling mechanism to halt the shuttle assembly after essentially retracing a part of the second straight portion 714 of the calibration path. The shuttle assembly then rotates in place approximately 90 degrees, turning so that the front portion of the shuttle faces away from the first and second edges previously encountered.

In a similar manner as with the second edge, the shuttle assembly continues along the calibration path to register locations of remaining edges of the substrate until the size, orientation and location of the substrate can be identified by the control processor. For example, when the substrate is a rectangular sheet of paper and the size, orientation and location of the sheet are unknown, the shuttle assembly follows a third straight portion 716 of the calibration path to detect and to register location of a third edge 718 as shown in FIG. 7. The shuttle assembly rotates approximately 90 degrees in executing a third turn. The shuttle assembly then follows a fourth portion 720 of the calibration path in order to detect and to register a location of a fourth edge 722. It should be understood that fewer edges are detected and registered when sufficient information describing the size and general orientation of the substrate are otherwise made available to the control processor. Once the control processor has identified the size, orientation, and location of the substrate from the edge locations stored in memory, the calibration process is completed.

As shown in the flow chart in FIG. 6 illustrating the preferred embodiment of the printing method of the present invention, once calibration is complete, a printing process is begun using the control processor to generate a suitable value for a starting position and orientation (block 614), based upon the size, orientation, and location of the substrate. The control processor then controls the propelling mechanism to propel the shuttle assembly to a starting location on the substrate corresponding to the starting position value (block 616). For example, where the substrate is a standard 8.5 by 11 inch sheet of paper, a corner location that allows for 1 inch margins is a suitable starting location. The shuttle assembly then rotates in place by an amount so as to orient the shuttle assembly in accordance with the starting orientation value.

Figure 8:
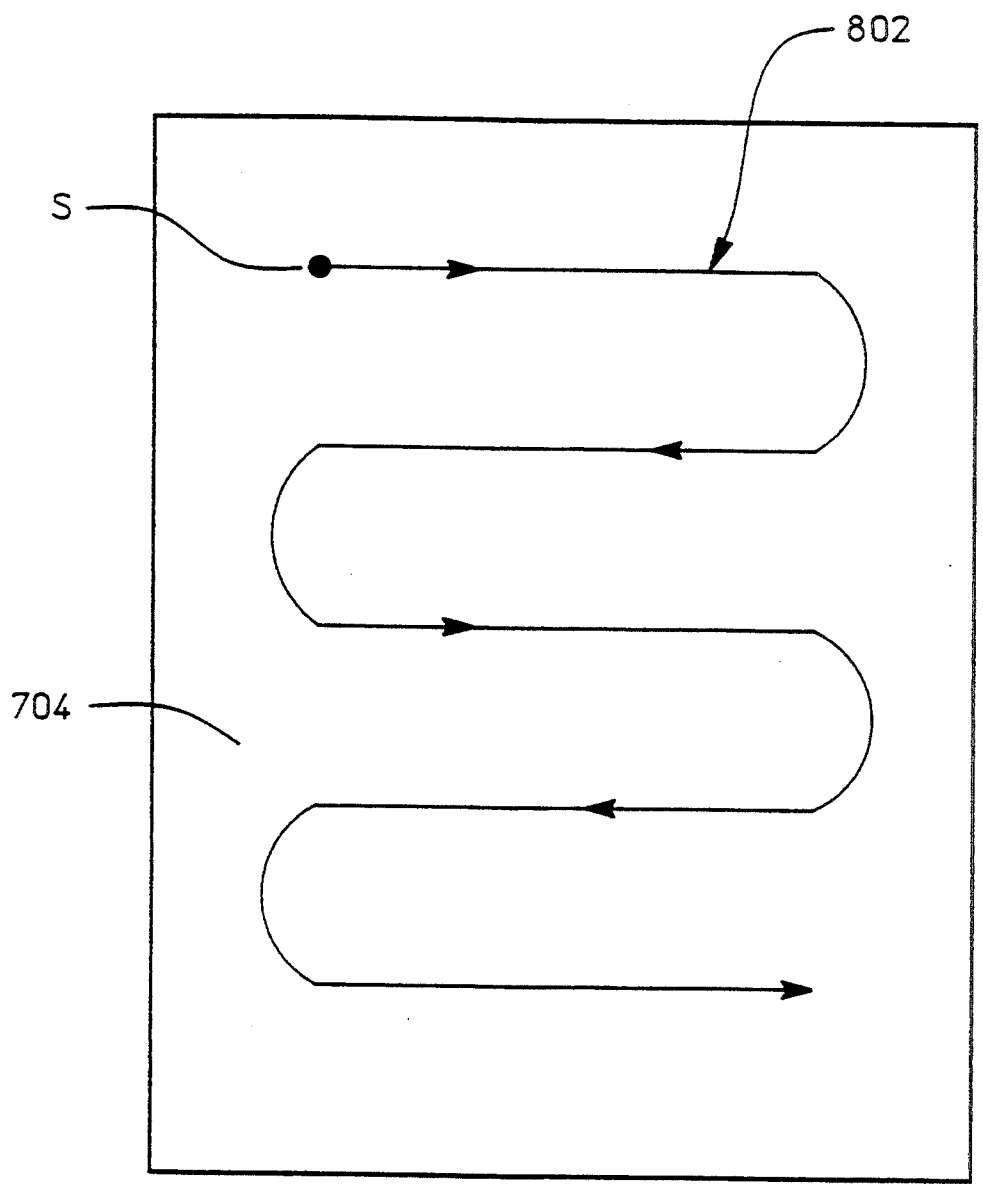
FIG. 8 is a plan view of an example printing path traversed by the shuttle assembly.

In response to the print signal, the control processor activates the propelling mechanism to propel the shuttle assembly from the starting location, over the surface of the substrate along a printing path (block 618), while selectively activating the printing mechanism as discussed previously. For example, it is preferable that the shuttle assembly follow a piecewise straightened serpentine printing path 802 over the sheet of paper 704 from the starting locations, as shown in FIG. 8. Arrowheads are shown drawn onto the printing path for the purpose of illustrating the direction that the shuttle assembly travels along the printing path. During printing, each straightened portion of the path is coincident with a respective one of the sequential printing swaths discussed previously.

Figure 9:
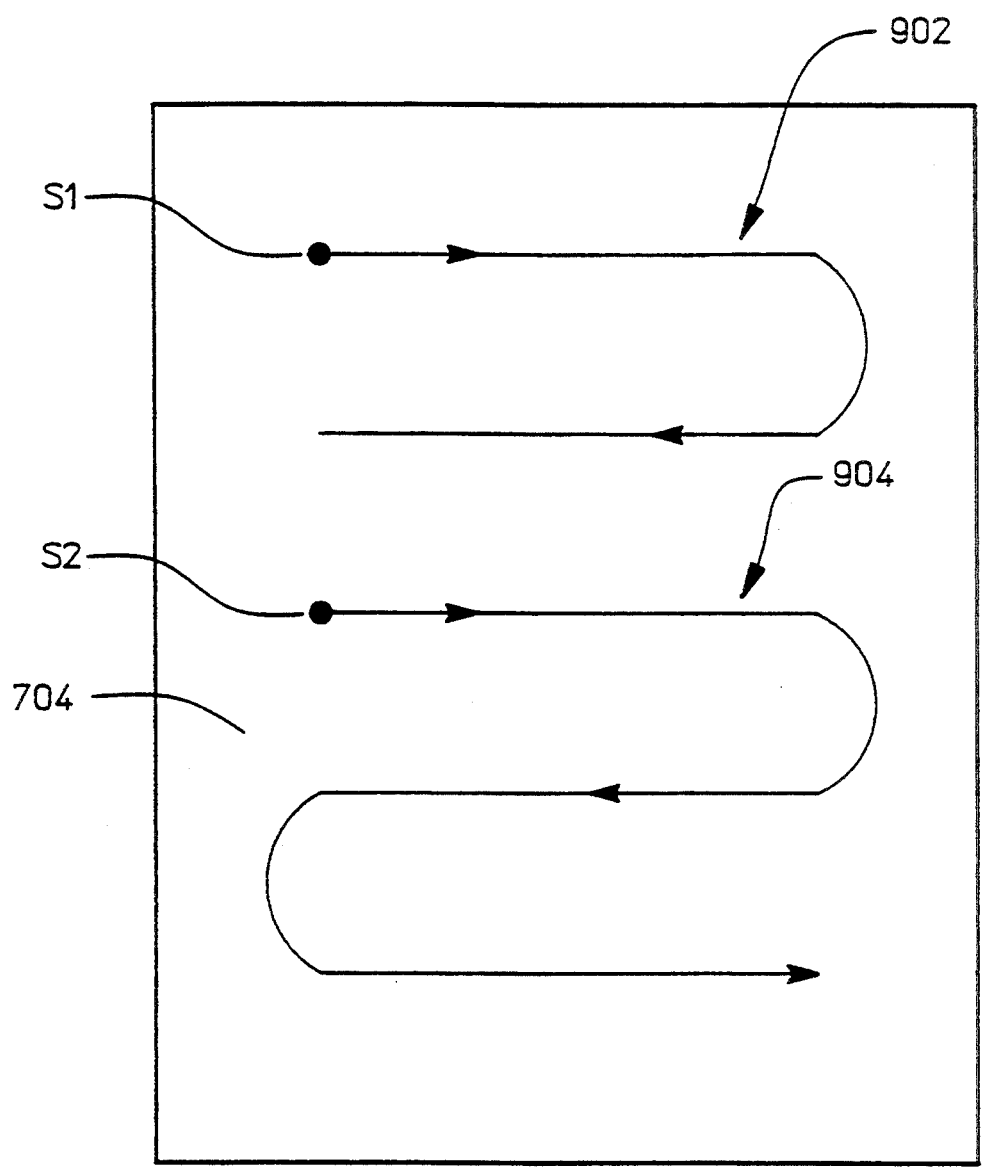
FIG. 9 is a plan view of respective printing paths traversed by each member of a pair of shuttle assemblies.

An alternative embodiment of the printing method of the present invention provides a plurality of shuttle assemblies, simultaneously creating indicia on the surface of the substrate. Accordingly, each shuttle assembly follows substantially the same printing method discussed previously and illustrated in FIG. 6 except that a plurality of distinct values for starting positions are generated so that each shuttle assembly is propelled to a respective distinct starting position. Each shuttle assembly is then propelled along a respective distinct printing path. An example of distinct printing paths that result using a pair of shuttle assemblies is shown FIG. 9. A first piecewise straightened serpentine printing path 902 over the sheet of paper 704 is shown originating from a first starting location S1. A second piecewise straightened serpentine printing path 904 over the sheet of paper 704 is shown as originating from a second starting location S2.

Figure 10:
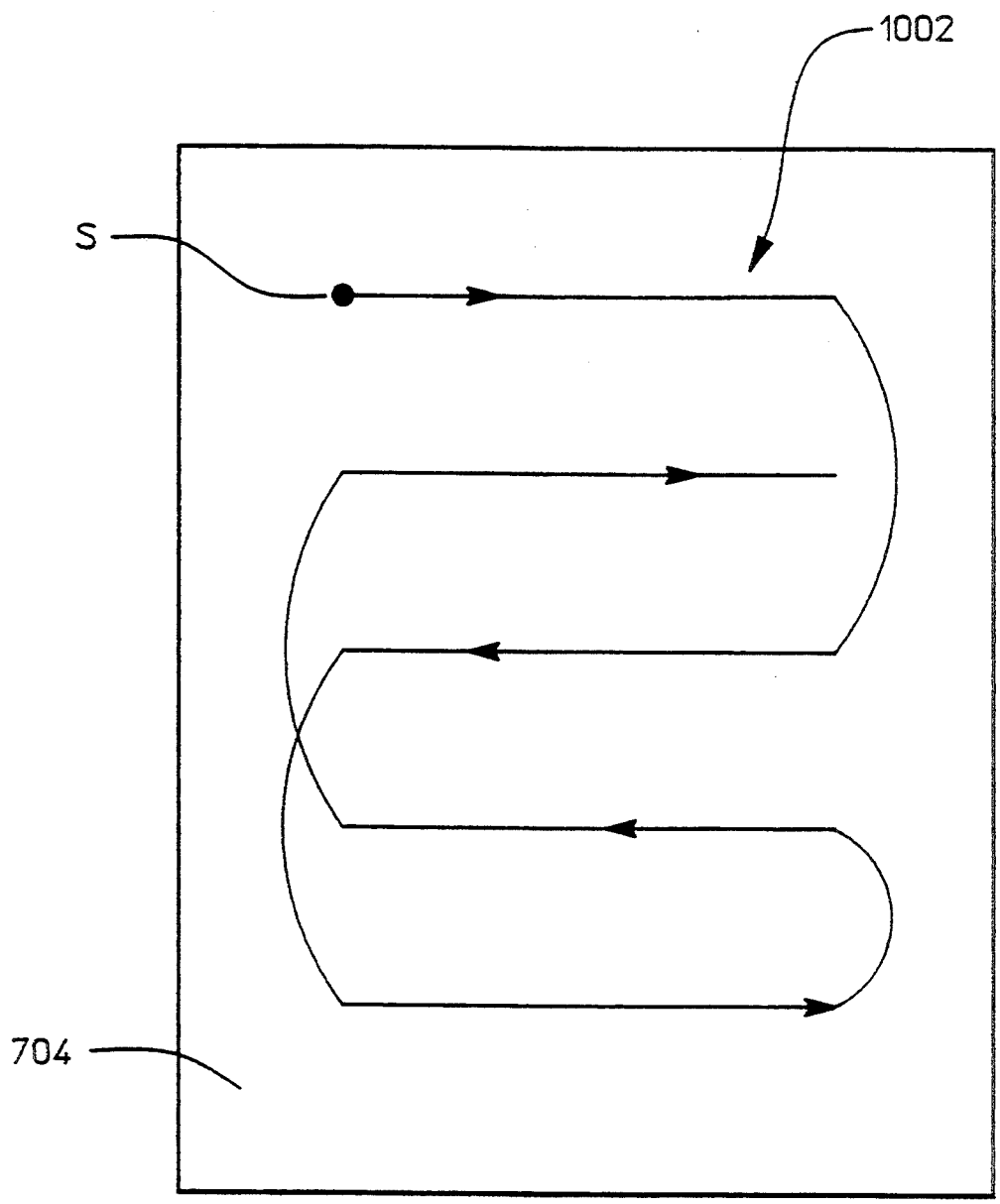
FIG. 10 is a plan view of another example printing path traversed by the shuttle assembly.

The particular shape of any printing path discussed previously should not be viewed as limiting the present invention since alternatively shaped printing paths can be used with beneficial results. For example, an interleaved printing path 1002 shown in FIG. 10 has an advantage that ink deposited upon the paper 704 during an initial portion of the printing path is likely to dry undisturbed, and therefore is less likely to be smeared by contact with the rolling member of the shuttle assembly.

During printing, it is desirable to maintain continuous frictional contact between the rolling members and the substrate, thereby limiting position encoding errors. If it is required that the shuttle print right up to the edge of the substrate, the shuttle assembly may not have enough room to complete a curved turn portion of the serpentine path while maintaining continuous frictional contact between one of the rolling members and the substrate. Accordingly, the serpentine path may be adapted to include a more complex maneuver wherein reverse motion of the shuttle essentially retraces a portion of the printing path, thereby insuring maintenance of continuous frictional contact between the rolling members and the substrate. If complex maneuvers are used, more time is needed to complete printing along a more complex printing path.

As indicated in the flow chart of FIG. 6 illustrating the preferred embodiment of the printing method of the present invention, if the shuttle assembly has completed printing on the substrate (block 620), then a job completion annunciator coupled to the control processor is activated by the control processor (block 622), thereby alerting the operator. It is preferred that the job completion annunciator be embodied in an audible annunciator disposed within the housing of the shuttle.

Figure 11:
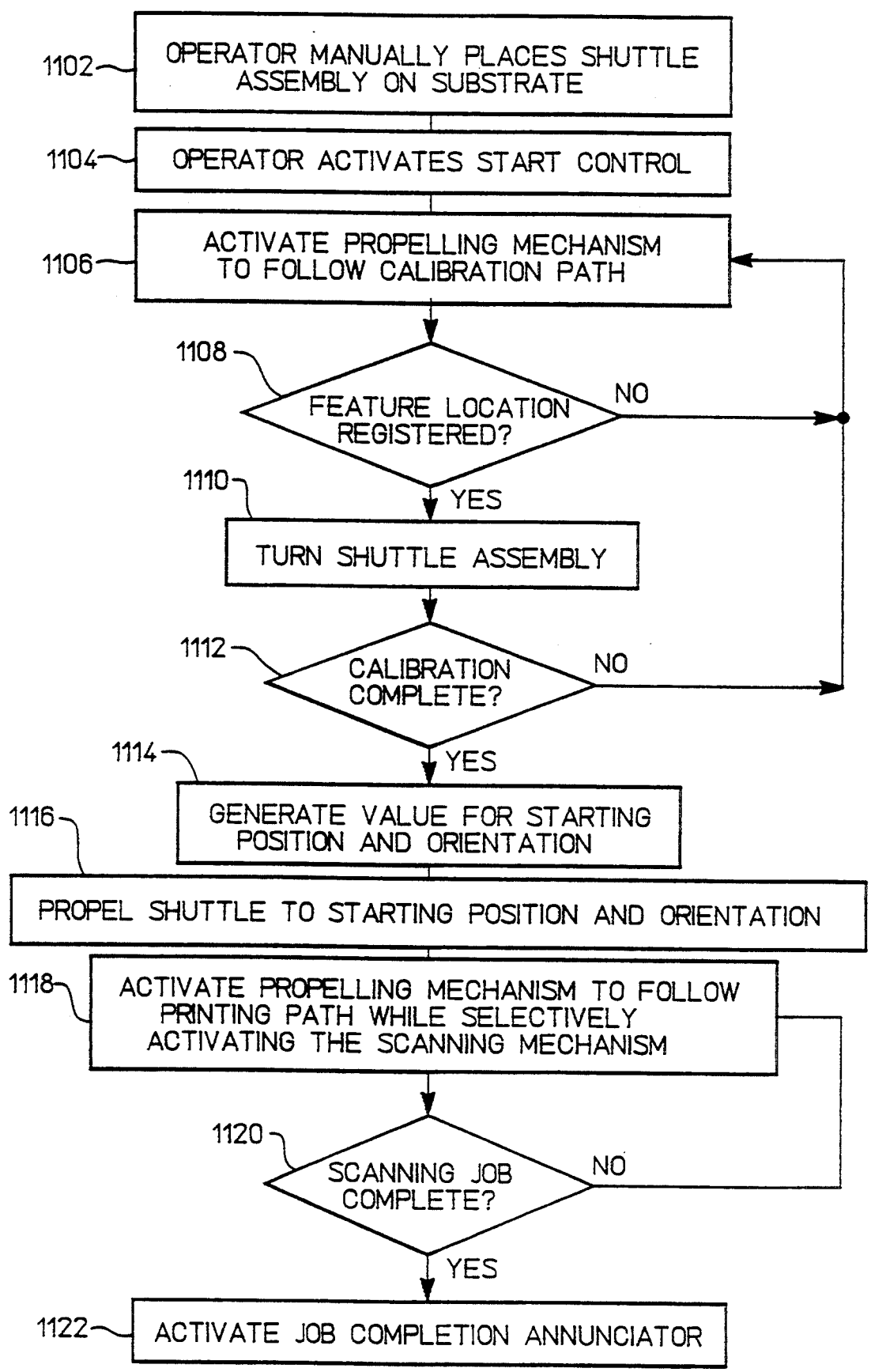
FIG. 11 is a flow chart of the scanning method of the present invention.

For the purposes of illustrating a preferred embodiment of the scanning method of the present invention, a flow chart is shown in FIG. 11. As shown, the preferred embodiment of the scanning method includes a calibration process that is substantially the same as the calibration process discussed previously with respect to the printing method and illustrated in FIG. 6. Accordingly, the example calibration path discussed previously and illustrated in FIG. 7 is likewise illustrative of the calibration process of the scanning method.

Once the calibration process is complete, a scanning process is begun. As shown in the flow chart in FIG. 11, a scanning process is begun using the control processor to generate a suitable value for starting position and orientation based upon the size, orientation, and location of the substrate. The control processor then controls the propelling mechanism to propel the shuttle assembly to a starting location on the substrate corresponding to the starting position value. The shuttle assembly then rotates in place to an orientation that corresponds to the starting orientation value.

The control processor activates the propelling mechanism to propel the shuttle assembly from the starting location, over the surface of the substrate along a scanning path, while selectively activating the scanning mechanism as discussed previously. For example, it is preferable that the shuttle assembly follow a piecewise straightened serpentine scanning path similar to the serpentine printing path discussed previously and shown in FIG. 8.

An alternative embodiment of the scanning method of the present invention provides a plurality of shuttle assemblies, simultaneously scanning the surface of the substrate. Accordingly, each shuttle assembly follows substantially the same scanning method discussed previously and illustrated in the flow chart of FIG. 11 except that a plurality of distinct values for starting positions are generated so that each shuttle assembly is propelled to a respective distinct starting position. Each shuttle assembly is then propelled along a respective distinct scanning path. For example, a pair of distinct scanning paths that result using a pair of shuttle assemblies are substantially similar to the pair of distinct printing paths discussed previously and shown in FIG. 9.

The particular shape of any scanning path discussed previously should not be viewed as limiting the present invention since alternatively shaped scanning paths can be used with beneficial results.

As indicated in the flow chart of FIG. 11 illustrating the preferred embodiment of the scanning method of the present invention, the job completion annunciator is activated by the control processor when the shuttle assembly has completed scanning the substrate, thereby alerting the operator.

In yet another alternative embodiment, the present invention operates as a stand alone copier. Substantially the same scanning method discussed previously and illustrated in FIG. 11 is used to scan an image of indicia present on the surface of a first substrate. However, rather than transmitting the electric image generated by scanning to a remotely located device as discussed previously, a record of the electric image is stored in the memory device of the control processor. Once this scanning is complete, substantially the same printing method discussed previously and illustrated in FIG. 6 is used to print upon a top surface of a second substrate. However, rather than receiving a print signal from a remotely located device, the control processor generates a print signal based upon the record of the electric image stored in the memory device. In response to the print signal received from the control processor, the printing mechanism creates indicia on the second substrate visually representative of the image of indicia present on the surface of the first substrate. The control processor automatically provides suitable scaling of the image when the operator selects either magnification or reduction modes.

While the invention has been described in detail herein in accord with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A printing method comprising the steps of:
   providing a shuttle assembly including a housing, a propelling mechanism that includes an electric motor rotationally coupled to a rolling member mounted under the housing, and a printing mechanism mounted on the housing;
   guiding the shuttle assembly over a top surface of a substrate by activating the motor of the propelling mechanism as the rolling member frictionally engages the top surface of the substrate; and
   activating the printing mechanism to write on the top surface of the substrate as the shuttle is guided over the top surface of the substrate, wherein:
   the shuttle assembly further includes a sensor coupled to the housing for sensing a substrate feature; and
   the step of guiding the shuttle assembly over the top surface of the substrate includes activating the motor of the propelling mechanism in response to the sensor sensing the substrate feature.

2. A method as in claim 1 wherein: the step of guiding the shuttle assembly over the top surface of the substrate includes activating the motor so as to propel the shuttle along a serpentine path.

3. A method as in claim 1 wherein the step of guiding the shuttle assembly further includes guiding a motion of the shuttle by activating the motor in response to the sensor sensing a location of the substrate feature, thereby providing a coarse alignment of the printing mechanism with the substrate feature.

4. A method as in claim 1 wherein:
   the printing mechanism comprises a print head array having plurality of print elements disposed along a transverse dimension of the print head array; and
   the step of activating the print head to write on the substrate includes:
     selecting a group of adjacent printing elements from the printing elements disposed along the transverse dimension of the array in response to the sensor sensing a location of the substrate feature, thereby providing a refined alignment of the grouped elements with the feature of the substrate; and
     activating the grouped elements to write indicia in alignment with the feature.

5. A method as in claim 1 wherein:
   the feature sensed by the sensor includes an edge of the substrate;
   the shuttle assembly further includes a position encoder coupled to the housing for monitoring position of the shuttle assembly with respect to the substrate; and
   the step of guiding the shuttle assembly over the top surface of the substrate further comprises the steps of:
     activating the propelling mechanism to propel the shuttle assembly to a location of the edge of the substrate;
     using the sensor to sense the edge of the substrate; and registering the location of the edge of the substrate in response to the sensor and the position encoder, thereby calibrating position of the shuttle assembly relative to the substrate.

6. The method of claim 5 wherein the step of guiding the shuttle assembly over the top surface of the substrate further comprises the steps of:
generating a value for a starting position on the surface of the substrate based upon the registered location of the edge of the substrate;
activating the motor of the propelling mechanism to guide the shuttle assembly to a location corresponding to the starting position value;
activating the motor of the propelling mechanism to guide the shuttle assembly along a printing path that originates from the starting position.

7. A method as in claim 1 wherein the step of activating the printing mechanism to write on the top surface of the substrate includes activating the printing mechanism in response to a print signal received from a remotely located computer.

8. A method as in claim 1 wherein the step of activating the printing mechanism to write on the top surface of the substrate includes activating the printing mechanism in response to a facsimile signal received from a remotely located facsimile machine.

9. A method of processing an image of indicia present on a top surface of a sheet of paper, comprising the steps of:
providing a shuttle assembly including a housing, a propelling mechanism that includes an electric rotationally coupled to a rolling member mounted under the housing, and an optical for sensing the image of indicial present on the top surface of the sheet of paper;
guiding the shuttle assembly over a top surface of a sheet of paper by activating the motor of the propelling mechanism as the rolling member frictionally engages the top surface of the sheet of paper; and
activating the optical sensor as the shuttle assembly is propelled over the surface of the sheet of paper, thereby generating an electric image signal representative of the image, wherein the step of guiding the shuttle assembly over the top surface of the sheet of paper includes activating the motor of the propelling mechanism in response to the optical sensor sensing a feature of the sheet of paper.
wherein the step of guiding the shuttle assembly over the top surface of the substrate includes mining the shuttle assembly by activating the motor so as to propel the shuttle along a serpentine path.

10. A method as in claim 9 wherein the feature sensed by the sensor includes an edge of the sheet of paper.

11. A method as in claim 9 wherein the feature sensed by the sensor includes indicia present on the top surface of the sheet of paper.

12. A method as in claim 9 wherein:
the feature sensed by the sensor includes an edge of the sheet of paper;
the shuttle assembly further includes a position encoder coupled to the housing for monitoring position of the shuttle assembly with respect to the sheet of paper; and
the step of guiding the shuttle assembly over the top surface of the sheet of paper further comprises the steps of:
activating the motor of the propelling mechanism to propel the shuttle assembly to a location of the edge of the sheet of paper;
using the optical sensor to sense the edge of the sheet of paper; and
registering the location of the edge of the sheet of paper in response to the optical sensor and the position encoder, thereby calibrating position of the shuttle assembly relative to the sheet of paper.

13. The method of claim 12 further comprising the steps of:
generating a value for a starting position on the surface of the first substrate based upon the registered location of the edge of the sheet of paper;
activating the propelling mechanism to propel the shuttle assembly to a location corresponding to the starting position value;
activating the propelling mechanism to propel the shuttle assembly over the surface of the sheet of paper along a scanning path that originates from the starting position.

14. A method as in claim 9 further comprising the step of transmitting the electric image signal from the shuttle assembly to a remotely located computer.

15. A method as in claim 9 further comprising the step of transmitting the electric image signal from the shuttle assembly to a remotely located facsimile machine.

16. A method of processing an image of indicia present on a top surface of a first substrate, comprising the steps of:
providing a shuttle assembly including a housing, a propelling mechanism that includes an electric motor rotationally coupled to a rolling member mounted under the housing, and an optical sensor for sensing the image of indicia present on the top surface of the first substrate;
guiding the shuttle assembly over a top surface of a first substrate by activating the motor of the propelling mechanism as the rolling member frictionally engages the top surface of the substrate; and
activating the optical sensor as the shuttle assembly is propelled over the surface of the first substrate, thereby generating an electric image signal representative of the image, wherein the step of guiding the shuttle assembly over the top surface of the substrate includes activating the motor of the propelling mechanism in response to the optical sensor sensing a feature of the substrate, wherein:
the shuttle assembly further includes a memory device and a printing mechanism mounted on the housing; and
the method further comprises the steps of:
storing a record of the electric image signal in the memory device;
guiding the shuttle assembly over a top surface of a second substrate by activating the motor of the propelling mechanism as the rolling member frictionally engages the top surface of the second substrate;
generating a print signal based upon the record of the electric image signal; and
using the printing mechanism to create indicia on the surface of second substrate in response to the print signal received by the printing mechanism, wherein the indicia on the second substrate is visually representative of the image of indicia present on the first substrate.

17. An apparatus comprising:
a housing;
an optical sensor mounted on the housing; and a propelling means for propelling the shuttle assembly over a top surface of a substrate, the propelling means including:
- a rolling member mounted under the housing for frictionally engaging the top surface of the substrate; and
- an electric motor disposed within the housing for coupling rotational energy to the rolling member; and the apparatus further comprising a printing mechanism mounted on the housing for writing on the top surface of the substrate as the motor propels the apparatus over the top surface of the substrate; and means for activating the motor of the propelling means in response to the optical sensor sensing an edge of the substrate.

18. An apparatus as in claim optical sensor is adapted for sensing an image of indicia present on the top surface of the substrate and for generating an electric image signal representative of the image.

* * * * *

UNITED STATES PATENT AND TRADEMARK OFFICE
CERTIFICATE OF CORRECTION

PATENT NO.   : 5,446,559
DATED        : August 29, 1995
INVENTOR(S)  : John R. Birk It is certified that error appears in the above-identified patent and that said Letters Patent is hereby corrected as shown below:

Column 17, line 30, --motor-- is missing before "rotationally";

Column 17, line 48, Replace "mining" with --turning --.

Signed and Sealed this

Thirteenth Day of February, 2001

Attest:

NICHOLAS P. GODICI

Attesting Officer    Acting Director of the United States Patent and Trademark Office